United States Patent
Zhu (10) Patent No.: US 8,397,272 B2
(45) Date of Patent: Mar. 12, 2013

(54) MULTI-STREAM DIGITAL DISPLAY INTERFACE

(75) Inventor: Ning Zhu, San Jose, CA (US)

(73) Assignee: Analogix Semiconductor, Inc., Santa Clara, CA (US)

( * ) Notice: Subject to any disclaimer, the term of this patent is extended or adjusted under 35 U.S.C. 154(b) by 677 days.

(21) Appl. No.: 12/535,160

(22) Filed: Aug. 4, 2009

(65) Prior Publication Data

US 2010/0037283 A1 Feb. 11, 2010

Related U.S. Application Data

(60) Provisional application No. 61/188,062, filed on Aug. 5, 2008.

(51) Int. Cl.
*H04N 7/16* (2011.01)
(52) U.S. Cl. ............. 725/151; 725/139; 370/395.1; 370/465; 370/503
(58) Field of Classification Search ........ 370/395.1, 370/465, 503; 725/139, 151
See application file for complete search history.

(56) References Cited

U.S. PATENT DOCUMENTS

| | | | | |
|---|---|---|---|---|
| 5,128,935 | A * | 7/1992 | Perloff et al. | 370/465 |
| 2002/0051468 | A1* | 5/2002 | Ofek et al. | 370/503 |
| 2005/0094640 | A1* | 5/2005 | Howe | 370/395.1 |
| 2008/0204285 | A1* | 8/2008 | Carter et al. | 341/67 |

OTHER PUBLICATIONS

International Search Report and Written Opinion of the International Searching Authority Dated Sep. 18, 2009, International Application No. PCT/US2009/004469.

* cited by examiner

*Primary Examiner* — Kristine Kincaid
*Assistant Examiner* — Sumaiya A Chowdhury
(74) *Attorney, Agent, or Firm* — Carr & Ferrell LLP (57) ABSTRACT

Multiple video streams can be transmitted over a high speed link. A connection with a receiver can be detected by a transmitter. The transmitter can then establish a link with the receiver. Multiple streams of video data can be packed into a transfer unit. The transmitter can then transmit the transfer unit with the multiple stream video data over one or more lanes of the link to the receiver. A high speed communications link between a receiver and a transmitter can transmit data for multiple video streams over a single lane within a data link. The high speed communication link is scalable in bandwidth and video/audio streams transmitted, and backward compatible with other types of video data communication connections. The high speed link may support up to eight video/audio streams simultaneously, thereby enabling full use of data link bandwidth.

24 Claims, 10 Drawing Sheets

MULTI-STREAM DIGITAL DISPLAY INTERFACE

CROSS-REFERENCE TO RELATED APPLICATION

The present application claims priority benefit to U.S. Provisional Patent Application No. 61/188,062 filed Aug. 5, 2008 and entitled "S-S Link: A Super-Speed Link for High Speed Digital Display Interface," herein incorporated by reference.

BACKGROUND OF THE INVENTION

1. Field of Invention

The present invention relates generally to high speed data links and, more particularly, to high speed links for video and audio interfaces.

2. Description of Related Art

High definition multimedia interface (HDMI) is a digital standard for video and audio transmission used in consumer electronics. The HDMI interface and link uses four pairs of wires to transfer a single video/audio stream from the transmitter to the receiver. One pair transfers the differential clock signal for synchronization of data, the other three pairs are used to transfer the pixel information. This use of four pairs for transmitting the video/audio information limits the scalability of the HDMI interface and link for higher bandwidth transmissions and multi-stream transmissions.

The DisplayPort (DP) communication standard is an interface and link protocol for transferring video/audio and data across computer systems and consumer electronics devices. The DP protocol is scalable in terms of usable bandwidth and has a higher bandwidth than HDMI. The DP protocol uses one to four pairs (called lanes) depending on the needed bandwidth to transmit a single video/audio stream. In case the link does not need four pairs of wires to transfer information, one or two lanes can also be used to transfer one stream of video/audio data depending on the bandwidth needed. Since all available lanes can only be used for a single stream, the DP protocol has no scalability with respect to transmission of multiple streams over the same pairs of connections.

It would hence be advantageous if a single fully scalable interface and link can be provided which scales for both bandwidth and number of video streams that can be transmitted. It would be further advantageous if the interface and link could be used instead of both HDMI and DP so that this interface and link can have widespread applicability.

SUMMARY OF THE INVENTION

A high speed communications link between a receiver and a transmitter can transmit data for multiple video streams over a single lane within a data link. The data link may include both a Physical (PHY) layer and a link layer, and may be used in place of other high speed digital links, for example high definition multimedia interface (HDMI) and DisplayPort (DP) standard links. The high speed communication link is scalable in bandwidth and video/audio streams transmitted, and backward compatible with other types of video data communication connections. The high speed link may support up to eight video/audio streams simultaneously, thereby enabling full use of data link bandwidth.

In an embodiment, multiple video streams can be transmitted over a high speed link. A connection with a receiver can be detected by a transmitter. The transmitter can then establish a link with the receiver. Multiple streams of video data can be packed into a transfer unit. The transmitter can then transmit the transfer unit with the multiple stream video data over one or more lanes of the link to the receiver.

In an embodiment, multiple video streams can be received over a high speed link. The link can be established between a transmitter and a receiver. The receiver can receive, from the transmitter, a transfer unit containing video data for multiple video streams over one or more lanes of the link. Multiple streams of video data can be retrieved from the transfer unit.

In an embodiment, a machine readable medium can have embodied thereon a program. The program can provide instructions for a method for transmitting or receiving multiple video streams over a high speed link.

In an embodiment, a transmitter unit for transmitting high speed video data may include a packing module, encoder and a transmitter interface. The packing module can be configured to pack video stream data for multiple video streams into at least one lane. The encoder can be configured to encode one or more transfer units having video data for the video streams. The transmitter interface can be configured to transmit the encoded transfer units over a link to a receiver.

DESCRIPTION OF EXEMPLARY EMBODIMENTS

A high speed communications link between a receiver and a transmitter can transmit data for multiple video streams over a single lane within a data link. The data link may include both a Physical (PHY) layer and a link layer, and may be used in place of other high speed digital links, for example high definition multimedia interface (HDMI) and DisplayPort (DP) standard links. The high speed communication link is scalable in bandwidth and video/audio streams transmitted, and backward compatible with other types of video data communication connections. The high speed link may support up to eight video/audio streams simultaneously, thereby enabling full use of data link bandwidth.

The high speed communication link of the present technology may be implemented as an aggregation of up to four logical high speed connections. Each high speed connection, or link, can carry at least one data stream and include one or more data lanes. A data lane may be composed of physical wires with matching impedance working in differential mode, and may transfer the data stream. Each lane may have a maximum bandwidth, such that multiple lanes in a link can be used to scale the bandwidth of the link. A data stream may be any clocked continuous data, for example video, audio or other communication application data.

The high speed communication link of the present technology differs from a link configured according to the DisplayPort standard. The DP standard uses one to four lanes to connect between two DP interfaces. The bandwidth available for the video and audio data can be configured as one, two or four lanes, and allows only one stream of video data across the link. Any excess bandwidth available is stuffed with dummy data, i.e. 0x0, to fill up the transmission band. Hence the DP standard is limited in that only one video data stream can be transmitted over the link.

The high speed communication interface of the present technology can scale with respect to available link bandwidth and link capability to carry more than a single stream of video and audio data. The link or connection formed by the interface can have up to four data link connections, wherein each data link connection contains up to four physical data lanes. Dynamic lane count allocation is enabled for each data link, and each data link is scalable with the number of video/audio streams configuration. Each data link can be configured to communicate multiple video/audio streams and have up to four lanes. Multiple video/audio streams can be sent over the same data link, and the speed of each lane can be dynamically configured to 2.7 Gbps or 5.4 Gbps.

Figure 1:
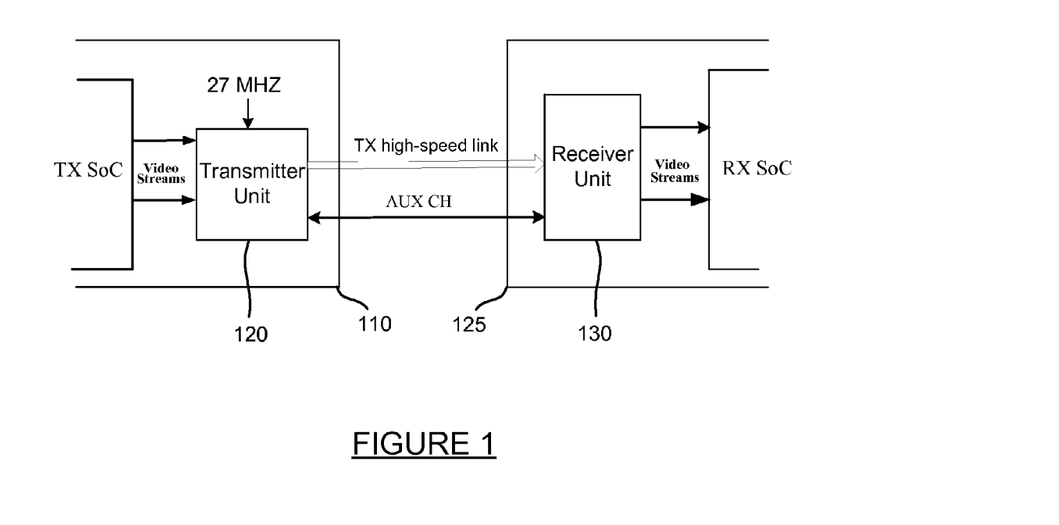
FIG. 1 is an exemplary block diagram of a high speed communication interface.

FIG. 1 is an exemplary block diagram of a high speed communication interface. The high speed communication interface includes a transmitter 110 and a receiver 125. Transmitter 110 includes a transmit "System on Chip" SoC which provides video streams to transmitter unit 120. Transmitter unit 120 receives the video streams, processes them and transmits video stream data to receiver 125. The video stream processing may include packing, stuffing, encoding, and other processing. Transmitter unit 120 may also detect a connection with receiver 125, retrieve the receiver speed and lane data from receiver 125, and perform link training with receiver 125. The receiver speed and data lane data can be retrieved by through an auxiliary channel (AUX CH).

Link training may be performed as described in VESA's DisplayPort 1.1a standard, which is herein incorporated by reference in its entirety. In some embodiments, transmitter unit 120 may determine the maximum speed and bandwidth that receiver unit 130 can operate at and transmit a test message to receiver unit 130 over a configured high speed link. Receiver unit 130 receives the message and compares the received message to an expected message to determine an error count. If the message is error free, the link is established. If not, the receiver indicates the message did not pass, the transmitter unit 120 determines a new bandwidth and speed, and re-transmits the message. The process is repeated until the message is received without errors by receiver 125.

Figure 2:
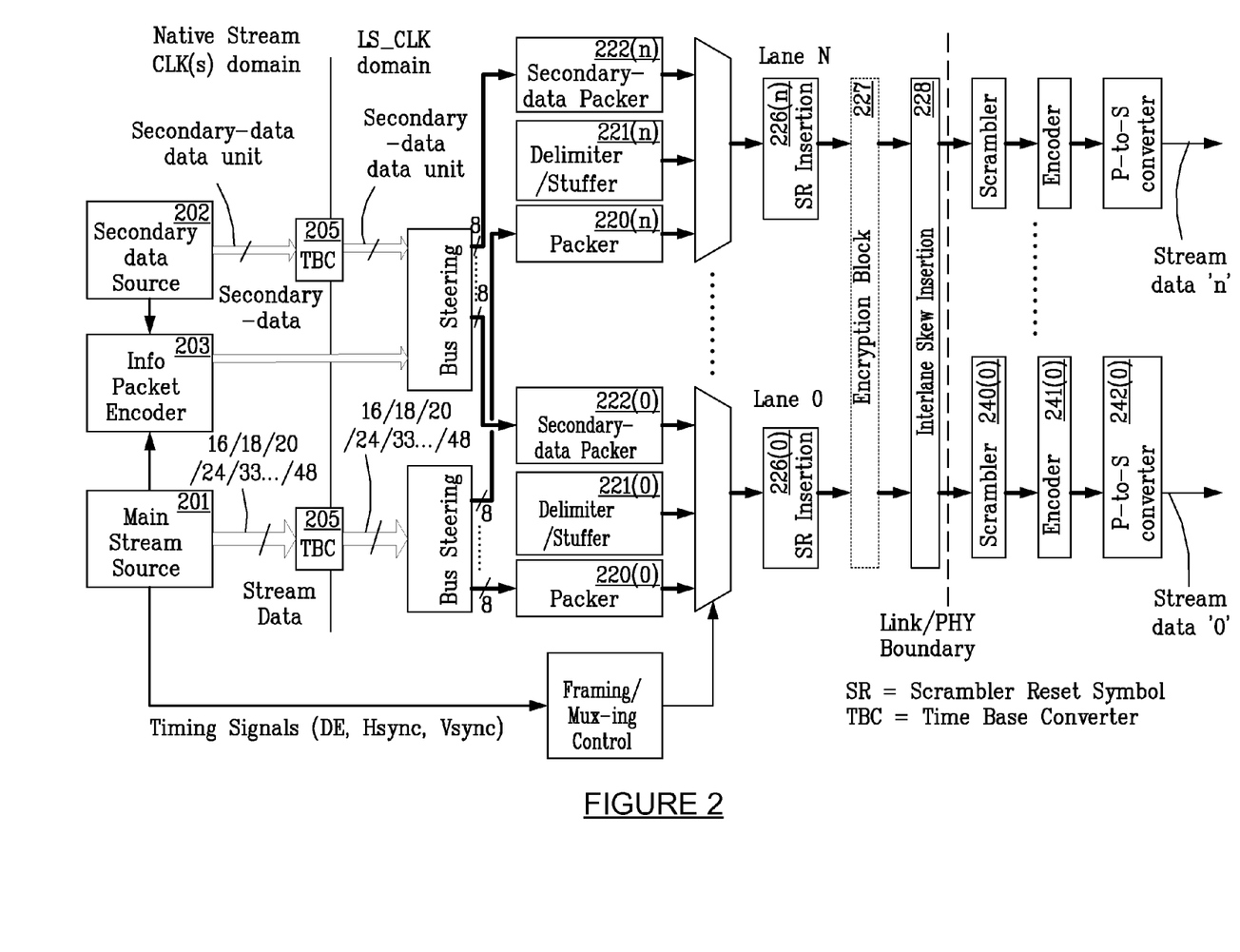
FIG. 2 is an exemplary block diagram of a transmitter.
Figure 3:
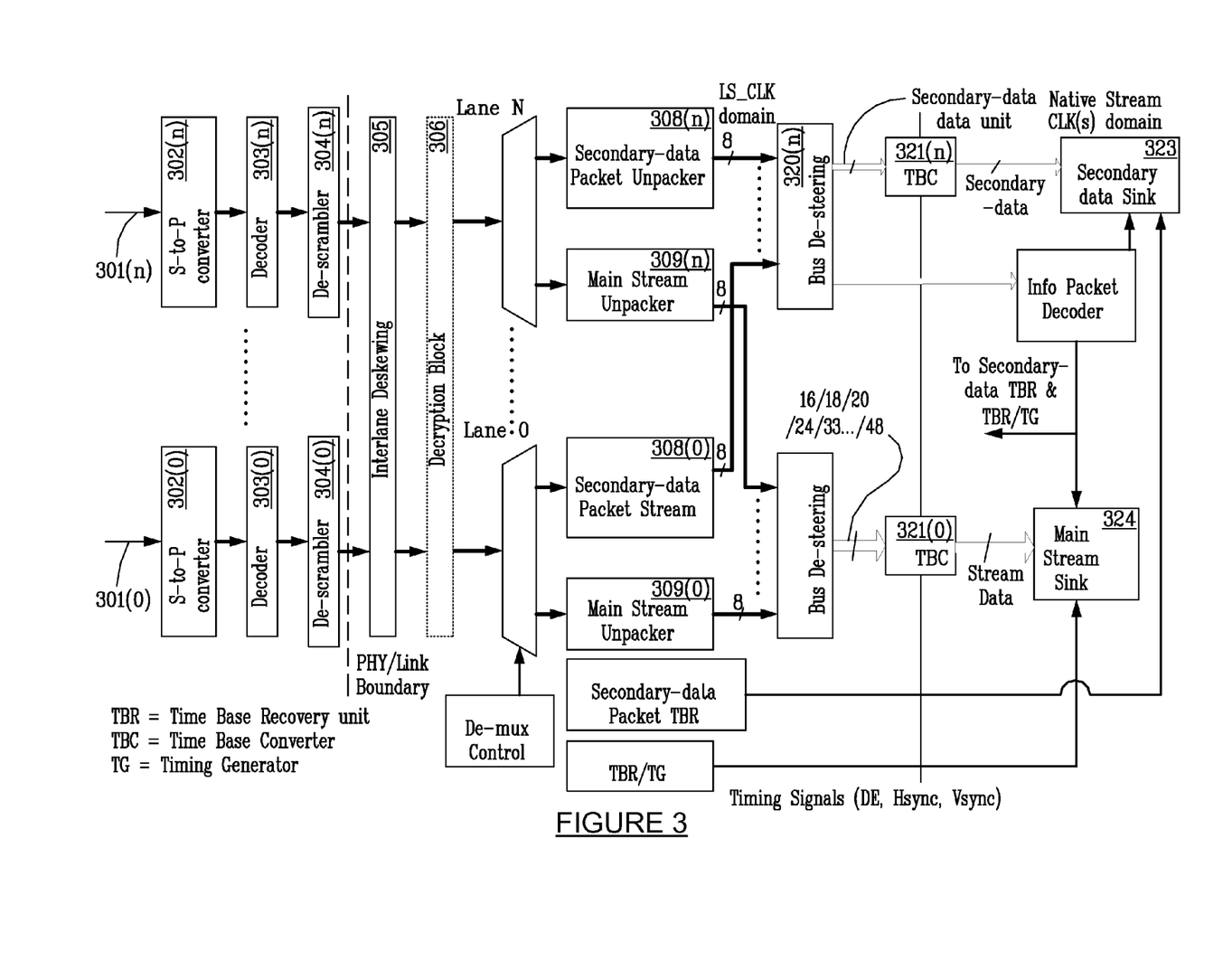
FIG. 3 is an exemplary block diagram of a receiver.

FIG. 2 is an exemplary block diagram of a transmitter in one embodiment of the claimed technology while FIG. 3 is an exemplary block diagram of a receiver in one embodiment of the claimed technology. The input to the transmitter of FIG. 2 consists of one or more video streams, represented the main stream source 201. Secondary data source 202 may contain audio streams corresponding to each video stream. Information regarding the video stream and the audio stream is encoded in the info packet encoder 203. This information, which exists in the video time domain, is framed and packed by packer blocks 220 and 222. The packed data may be converted to the transfer unit (TU) in the link symbol clock domain.

To avoid the oversubscription of the link bandwidth, the packed data rate may be equal to or lower than the link symbol rate. When the packed data rate is lower than the link symbol rate, the link layer may perform symbol stuffing. During the active video period, stuffing symbols may be framed with pre-defined control symbols. This framed data is mapped to the lanes of the data link. The stream clock time base is converted to the link symbol clock from the stream clock using a time base converter (TBC) 205 in FIG. 2. A typical relationship between the stream clock and the link symbol clock is:

$$F_{strm\_clk}=(M/N)*F_{ls\_clk} \qquad (1),$$

The video/audio stream clock timing stamp is also packed into the Data Link. The clock information (M and N values) of each stream is generated on the transmitter side and used on the receiver side to recover the original stream clock. As illustrated in FIGS. 2 and 3, video data is encrypted, skewed, scrambled and encoded before transmission and upon receipt.

Figure 4:
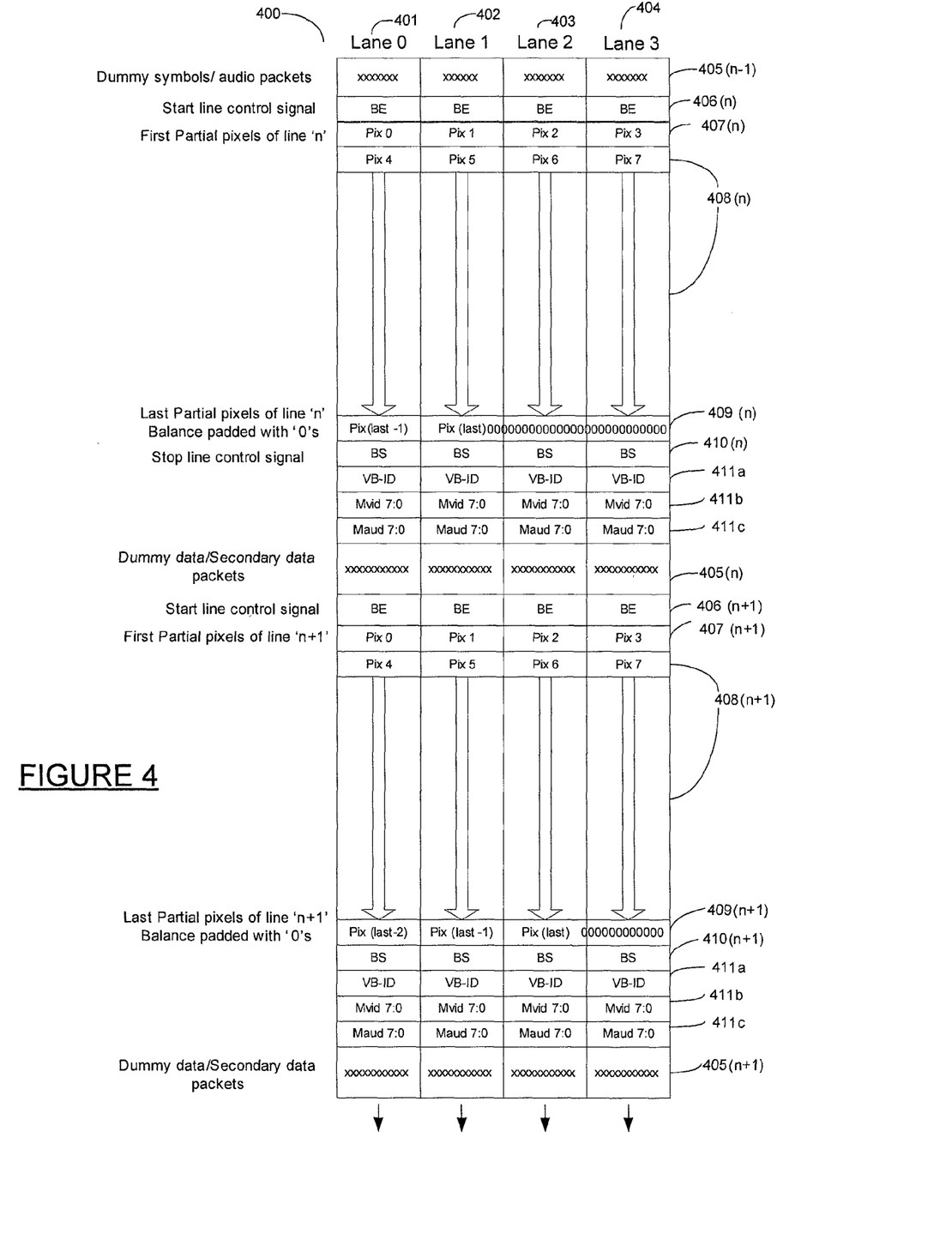
FIG. 4 illustrates an exemplary data structure for video/audio stream framing and packing scheme.

FIG. 4 illustrates an exemplary data structure for an video/audio stream framing and packing scheme. The scheme uses a four lane data link 400 having lane0 401, lane1 402, lane2 403, and lane3 404, respectively. The stream data from source 201 is packed such that each line data is spread across all the lanes used. The start of line and end of any line 'n' in the stream are designated by blanking end (BE) 406(n) and blanking start (BS) 410(n) symbols. In the embodiment shown, the first pixel starts at lane 0 as shown in 407. The pixels are packed by the packer 220 and in order per lane as shown at 408 and any partial lines left may be filled with zeros as shown at 409. Vertical blanking Id (VB-ID) symbol, M value for video (Mvid[7:0]) and M value for audio (Maud[7:0]) symbols are packed at 411a, 411b and 411c and main stream attribute and audio packets 405 (n) for the stream line 'n' are packed by the secondary packer 222 after that. The process is then repeated for line n+1.

This packed data is converted into transfer units (TU) in the link symbol clock domain which uses the clock modified as defined earlier by the time base converter (TBC) 205. To avoid the oversubscription of the link bandwidth, the packed data rate may be equal to or lower than the link symbol rate. When the packed data rate is lower than the link symbol rate, the link layer may perform symbol stuffing. This is done by the delimiter/stuffer block 221 shown in FIG. 2. During the active video period, stuffing symbols may be framed with pre defined control symbols within each TU. The TU size typically will be in the range of 32 to 128 link symbols per lane. The source device of FIG. 2 fixes the TU size for a given video timing format. The first pixel data of the horizontal active display line, immediately after BE, may be placed as the first valid data symbols of the first TU of a line.

Figure 5:
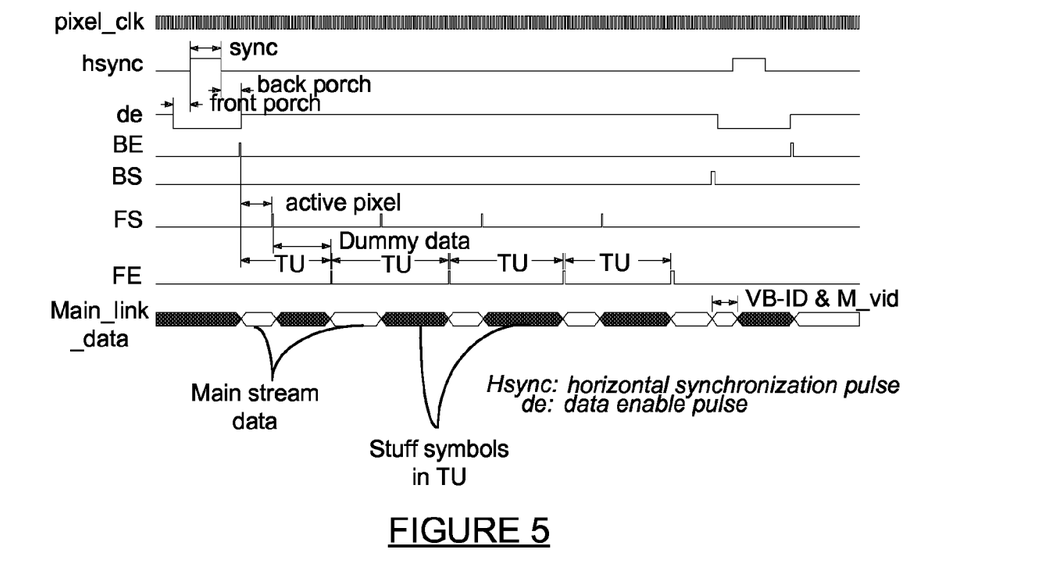
FIG. 5 illustrates a timing diagram for data signals within a transfer unit.

FIG. 5 illustrates a timing diagram for data signals within a transfer unit. Each TU based on the available bandwidth can contain stuffing data. This is designated in the front end by a control signal indicating start of stuff data, typically the control signal is designated as a fill start (FS) symbol. Similarly the end of stuff data is designated by another control signal to designate the fill end (FE) symbol.

Figure 6:
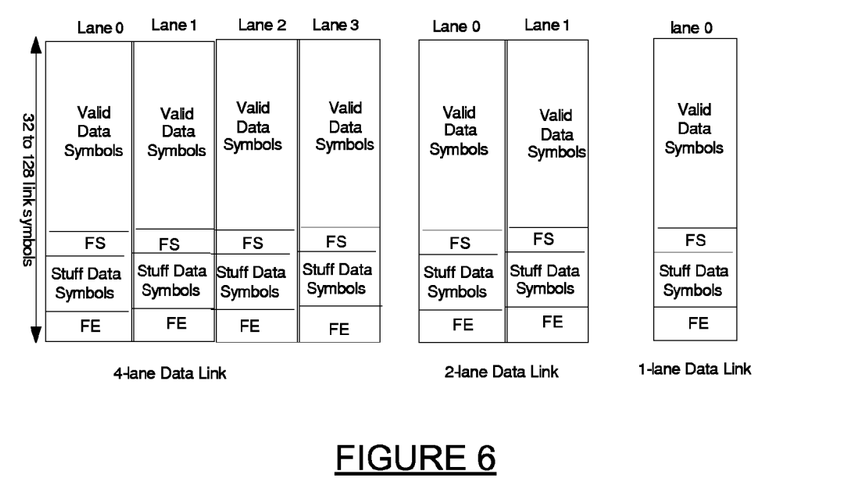
FIG. 6 illustrates a data structure for a transfer unit in a DisplayPort standard.

FIG. 6 illustrates a data structure for a transfer unit in a DisplayPort standard for four lanes, two lanes and single lane link usage. The link is capable of handling multiple streams of video streams over the same data link. This allows the link scale as the need for multiple video data transmission becomes necessary. For handling multiple video/audio streams, the Data Link uses a different stuffing scheme vs. what is used in DisplayPort standard v1.1a designated for signal stream. First each video stream is separately packed into 1/2/4 lanes using the same protocol as described earlier and shown in FIG. 4 using the packer 220. The video streams are stuffed together into the TU.

Figure 7:
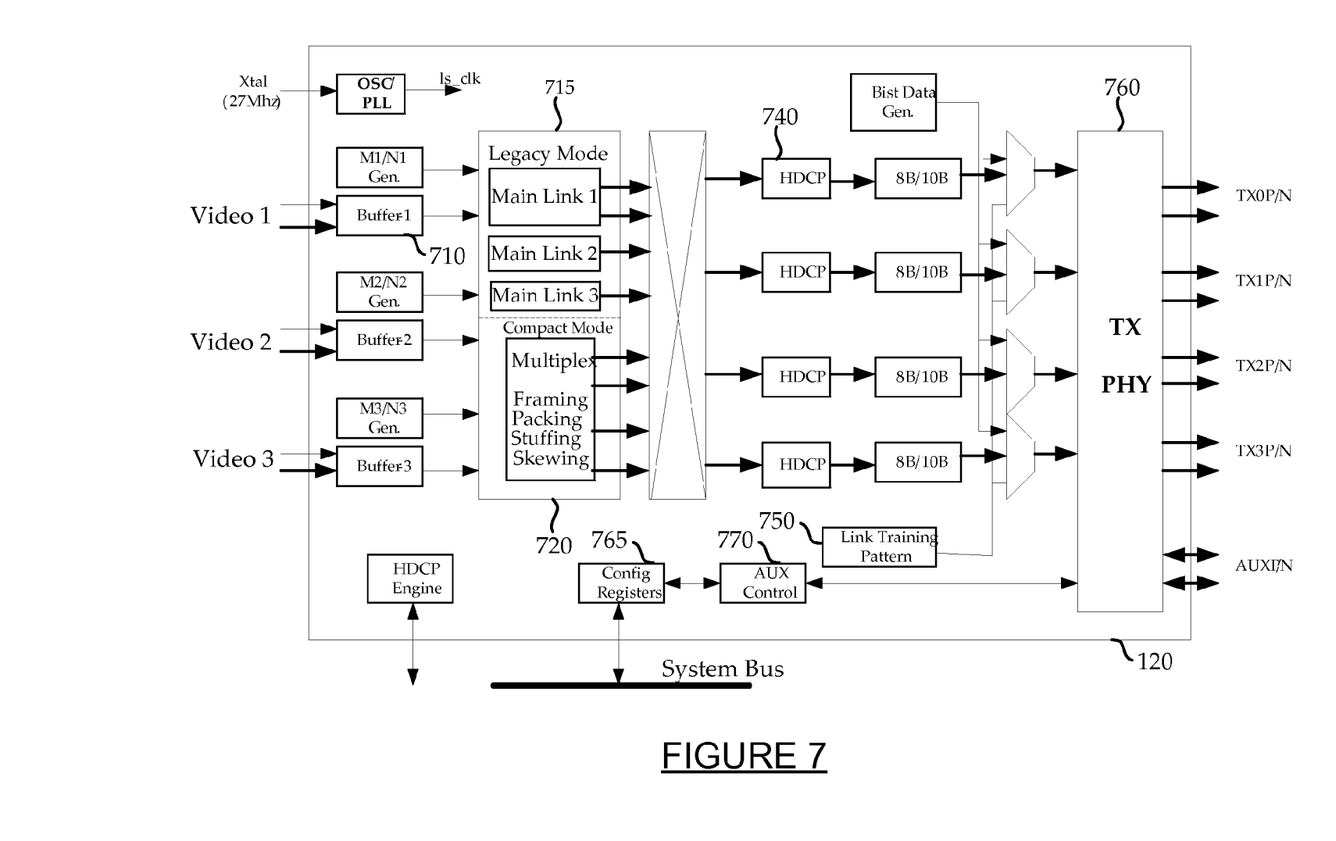
FIG. 7 is another exemplary block diagram of a transmitter.
Figure 8:
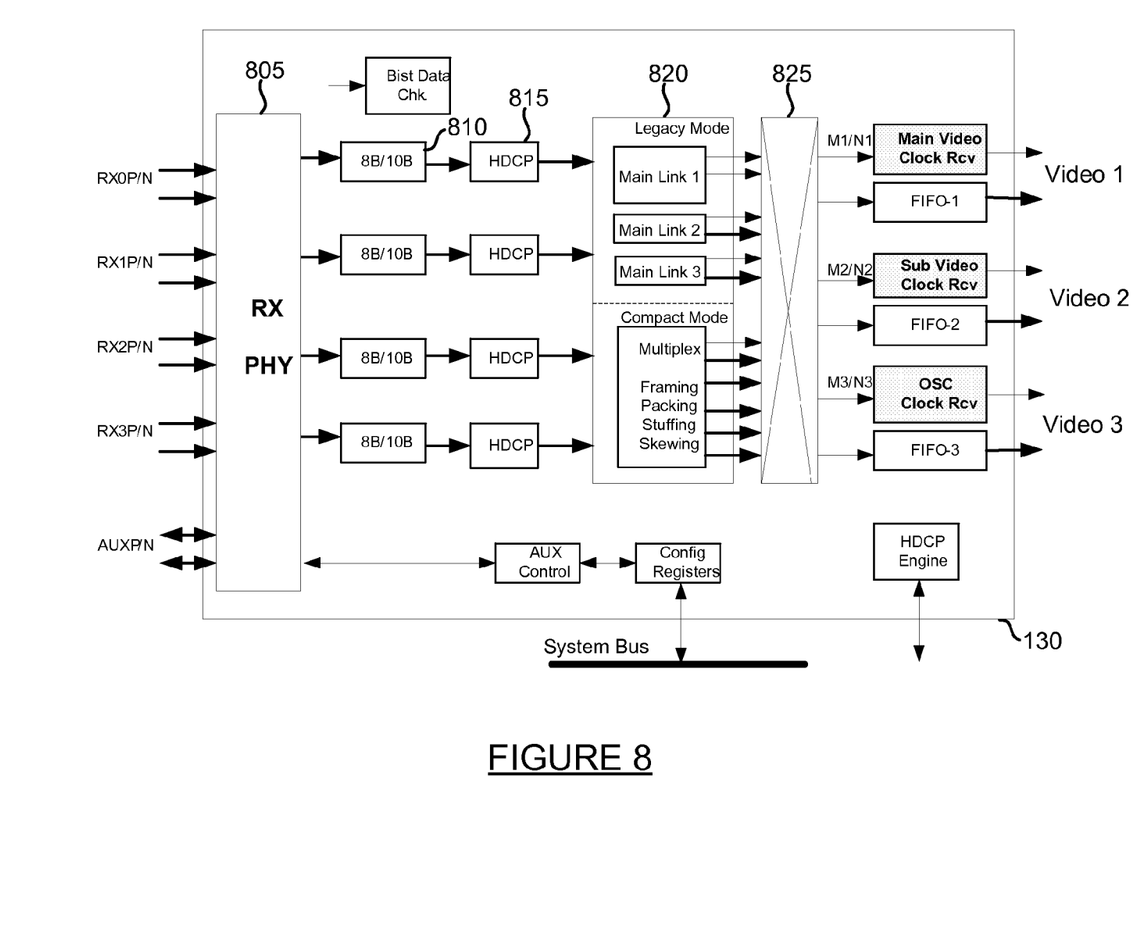
FIG. 8 is another exemplary block diagram of a receiver.

FIG. 7 is another exemplary block diagram of a transmitter and FIG. 8 is another exemplary block diagram of a receiver. The transmitter in FIG. 7 receives multiple video streams into a corresponding buffer, such as buffer 710. The video streams may be identified as a Video 1, Video 2 and Video 3 signal. The three received video signals may be any type of video, such as a main video signal, sub-video, or OSD video signal, and at any frequency, including 162 MHz, 74.25 MHz, and 148.5 MHz. The signal data is then received by legacy mode module 715 or compact mode module 720, depending on the configuration of the transmitter, receiver, connection and other components.

Transmitted data may be processed by according to different formats, such as a legacy format and a compact format. Legacy mode module 715 may be used when the transmitter is configured to operate as in DataPort standard, and may include modules for processing different links, identified as Main Link 1, Main Link 2, and Main Link 3 module. Each module may process any type of video link, such as a main link, sub link, or OSD link. When in compact mode, module 720 may be used when transmitting multiple video streams per lane. Compact mode module 720 can include hardware and software for performing multiplexing, framing, packing, stuffing and skewing the video stream into video data. For example, the compact mode module may include a framing module, packing module, stuffing module and skewing module for processing video and other data.

After processing by either the Legacy Mode or Compact Mode, the signals may be processed and applied to individual HDCP modules 740. The individual modules may be configured and controlled by an HDCP engine. The signals may then be encoded, for example by 8B/10B encoding, and are then selected for output through output layer 760. Note that during link training, a link training pattern module 750 provides output to a receiver through physical output later 760. An auxiliary output may also be implemented by AUX control 770. The AUX control 770 may determine the parameters of the receiving node and use the parameters to configure the link between the transmitter and the receiver. The link information is provided to a system bus through configuration registers 765.

The receiver 130 of FIG. 8 receives the transmitted data and processes the data to generate video signals. The data received at physical layer 805 is decoded by decoder 810 and processed by HDCP module 815, as driven by an HDCP engine. The resulting signal is then processed to unpack the transfer units, for example in either a legacy mode or a compact mode by module 820. In legacy mode, a main link 1, 2 and 3 are determined and provided to module 825. In compact mode, the data is framed, unpacked, unstuffed, and unskewed by one or more modules which perform these operations. The data is then processed by module 825 and forwarded as video signals.

Figure 9:
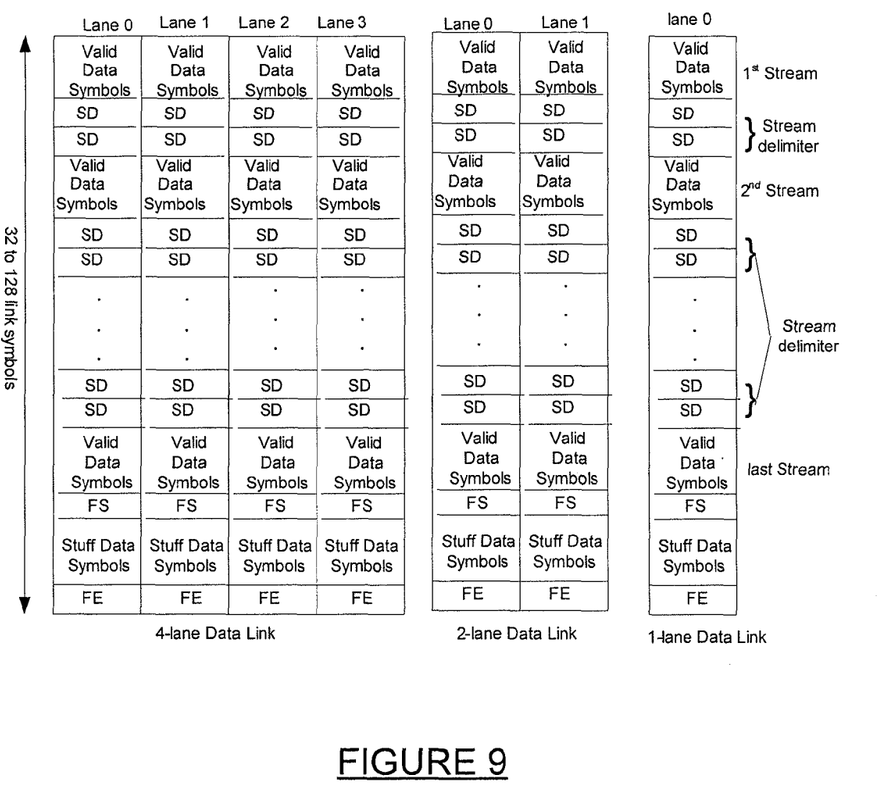
FIG. 9 illustrates exemplary data structures for a high speed communication interface transfer unit.

FIG. 9 illustrates exemplary data structures for a high speed communication interface transfer unit. A special symbol may be used as the stream delimiter, called the SD symbol. In order to increase the reliability, in some embodiments, two consecutive 'SD' symbols may be used as the stream delimiter wherein the first SD symbol may appear at the even entries (entry 2, 4, . . . 60) within the TU. FIG. 9 shows multiple streams data packing into TU in different lane count configurations. The stuffing and delimit symbol inclusions are shown when using 4 lanes per Data Link, 2 lanes per Data Link and 1 lane per Data Link.

Figure 10:
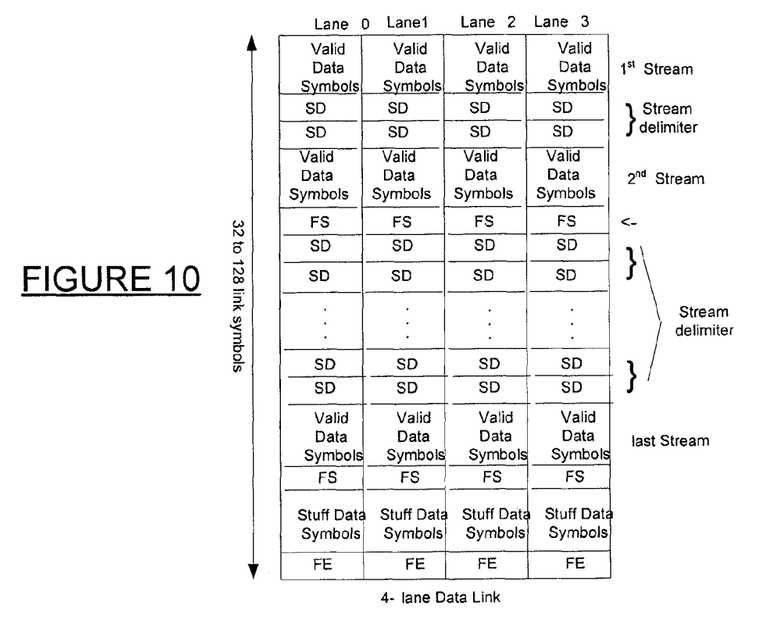
FIG. 10 illustrates another exemplary data structure for a high speed communication interface transfer unit.

FIG. 10 illustrates another exemplary data structure for a high speed communication interface transfer unit. When there are only odd number of entries for valid data symbols within the TU for a specific video stream, a FS symbol is be inserted at the end of this stream before the SD symbol so that the SD symbols are inserted at the even entries in the TU and the receiver can correctly recover the same video stream. FIG. 10 shows such a data structure in 4-lane data packing case.

Figure 11:
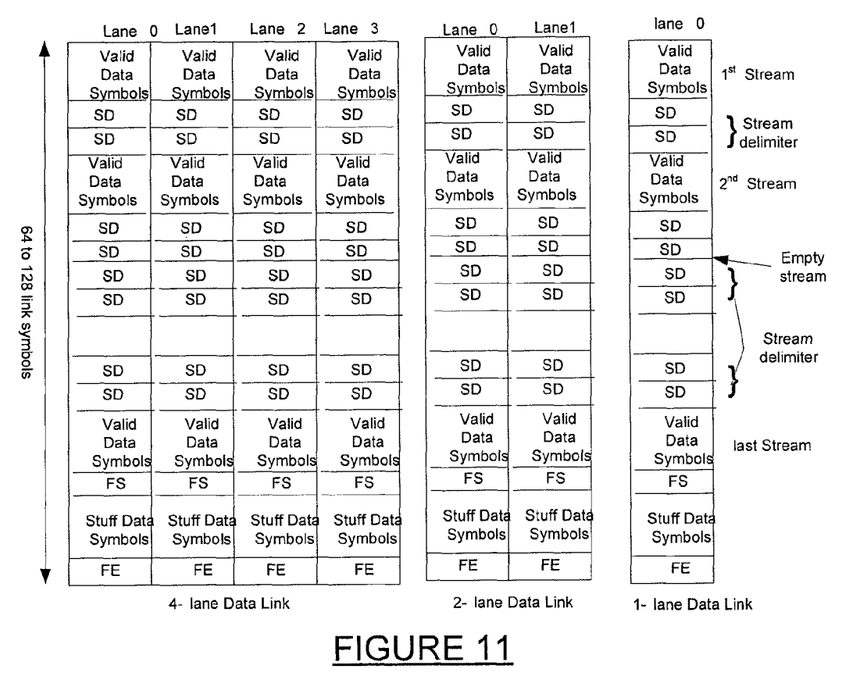
FIG. 11 illustrates another exemplary data structure for a high speed communication interface transfer unit.

Another special case is one where one of the video streams is empty. In such case the consecutive SD symbols should still be inserted at the place of this stream with no data symbols inserted in between. FIG. 11 shows such a case with 4-lane, 2-lane and 1-lane data packing scenario.

Once the video/audio streams are converted to TU they are processed as in prior art through SR insertion 226, encryption 227, and interface skew insertion 228. This processed TU is then sent to the scrambler 240, encoder 241 and parallel to serial converter 242 before transmission over the selected lane of the Link.

At the receiver side the reverse order happens to the serial data received 301. A serial to parallel converter 302 is used to convert the received serial data into parallel form. It is then decoded in the decoder 303 and de-scrambled in the de-scrambler 304. This parallel data is then sent through for inter-lane de-skewing 305 and decryption 306. Both the main stream and secondary streams are then unpacked in the main unpacker 309 and secondary unpacker 308 and recombined to generate the original data streams of the main video stream 324 and the secondary stream 323. The stream clock is also recovered from the received information to re-generate and synchronize to the output stream of data at the TBC 321.

Figure 12:
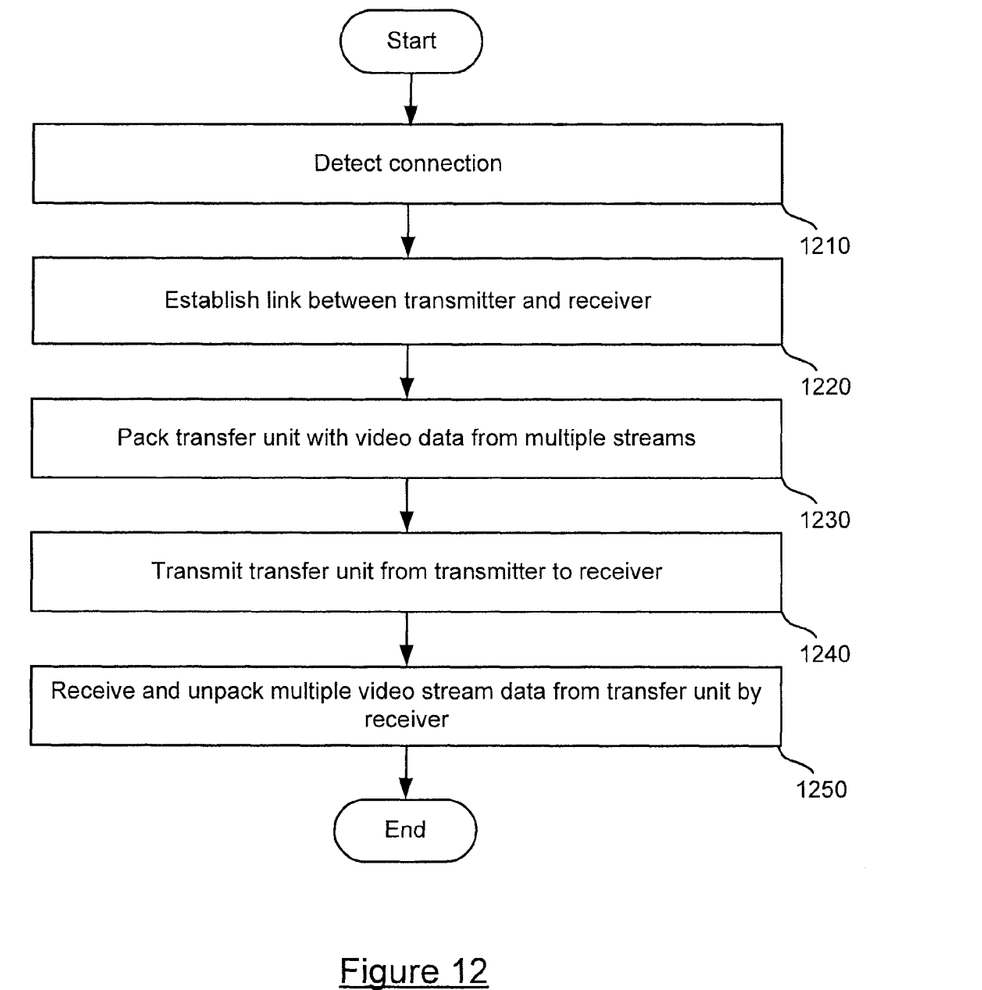
FIG. 12 is a flow chart of an exemplary method for transferring video data.

FIG. 12 is a flow chart of an exemplary method for transferring video data. A connection is detected at step 1210. The connection can be detected by a transmitter when the transmitter and receiver connection is made or powered on. A link can be established between the transmitter and receiver at step 1220. Establishing a link may include the transmitter receiving the speed and data lane data for a receiver (for example through an auxiliary channel), determining a bandwidth for the connection, and performing link training for the connection based on the determined bandwidth. The link training may include sending a test pattern over the configured data lanes to the receiver by the transmitter and determining if the receiver successfully received the message with no errors.

After the link is established, a transfer unit may be packed with video data from multiple streams at step 1230. The packing may include framing video streams, packing each video stream, combining the packed video streams into data lanes, and stuffing the data lanes with additional symbols. The transfer unit may also include packed clock data used for unpacking the video data. Packed video stream data may include multiple streams as identified by a stream delimiter symbol. In some embodiments, the stream delimiter symbol may occur in consecutive pairs and being on an even line within the transfer unit.

The transfer unit with the video data for multiple video streams may be transferred from the transmitter to the receiver at step 1240. The data may be encoded prior to transfer. Transfer of the data may occur over the configured data lanes that were determined during link training at step 1220. A receiver may receive the transfer unit and unpack the video data and other data in the transfer unit at step 1250. The receiver may unpack the video data and clock data, determine frame data from the video data, and output the video frames.

In order for the link to work with legacy DP systems the compatibility is established by adding and modifying the DP registers to include the link identification, link capacity information, multi stream capacity etc. This allows the link to be seamlessly used with legacy DP systems having restriction of single stream and with new connections, where, up to eight video/audio streams can be transmitted over the Link.

In the prior art only one video stream could be sent via any one link. This was limiting in the extreme and non-scalable. The link can send multiple streams over the same link as long as the link bandwidth permits. The link is also completely backward compatible to DP in single stream mode and has the capability to use one, two or four lanes per link to accommodate the bandwidth of the link. Hence what is provided is without limiting a new and scalable communication and data link that can be used for both consumer and computer fields.

The transmitter and receiver of the present technology may be implemented in a variety of ways. Both the transmitter and receiver can include hardware and software, and may include memory (not shown) that comprises a computer readable storage medium. Software such as programs or other executable code may be stored on a memory within the transmitter and the receiver. The transmitter and receiver may include at least one processor, that may include and/or execute software and/or firmware to execute various modules described herein. Alternatively, the module described herein may be implemented by circuitry elements.

It is noteworthy that any hardware platform suitable for performing the processing described herein is suitable for use with the technology. Computer-readable storage media refer to any medium or media that participate in providing instructions to a central processing unit (CPU) for execution. Such media can take forms, including, but not limited to, non-volatile and volatile media such as optical or magnetic disks and dynamic memory, respectively. Common forms of computer-readable storage media include a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

The present invention is described above with reference to exemplary embodiments. It will be apparent to those skilled in the art that various modifications may be made and other embodiments can be used without departing from the broader scope of the present invention. For example, embodiments of the present invention may be applied to any system (e.g., non-speech-enhancement system) utilizing AEC. Therefore, these and other variations upon the exemplary embodiments are intended to be covered by the present invention.

The invention claimed is:

1. A method for transmitting multiple video streams over a high speed link, comprising:
   detecting a connection with a receiver by a transmitter;
   establishing a link comprising a plurality of lanes with the receiver by the transmitter;
   framing data into multiple streams of video data;
   packing the multiple streams of video data into a transfer unit; and
   transmitting by the transmitter the transfer unit having the multiple stream video data over one or more lanes of the link to the receiver, at least one of the one or more lanes of the link having the multiple streams of video data transmitted thereon.

2. The method of claim 1, wherein packing includes packing framed information about the video data into one or more lanes of the link.

3. The method of claim 2, wherein framed information is packed into up to four lanes of the link.

4. The method of claim 1, wherein packing includes identifying video streams within the transfer unit using a stream delimiter.

5. The method of claim 4, wherein separate streams are identified by two consecutive stream delimiters.

6. The method of claim 4, wherein a stream delimiter appears on an even line within the transfer unit.

7. The method of claim 6, wherein a filler symbol is used to fill in an odd line just before a stream delimiter appears on an even line.

8. The method of claim 1, wherein the transfer unit includes clock timing stamp data.

9. The method of claim 1, wherein establishing a link includes receiving data speed and lane information from the receiver by the transmitter.

10. The method of claim 1, wherein establishing a link includes determining the bandwidth of the connection by the transmitter.

11. The method of claim 1, wherein establishing a link includes performing link training between transmitter and receiver.

12. A method for receiving multiple video streams over a high speed link, comprising:
   establishing a link comprising a plurality of lanes with a transmitter by a receiver;
   receiving by the receiver a transfer unit containing video data for multiple video streams over one or more lanes of the link with the transmitter, at least one of the one or more lanes of the link having the multiple streams of video data transmitted thereon;
   retrieving the multiple streams of video data from the transfer unit; and
   generating frames of video data from the video data for the multiple video streams.

13. The method of claim 12, wherein retrieving the multiple streams includes identifying a stream delimiter in the transfer unit.

14. The method of claim 12, wherein separate streams of video are identified using two consecutive stream delimiters.

15. The method of claim 14, wherein a stream delimiter appears on an even line within the transfer unit.

16. The method of claim 12, wherein the transfer unit includes clock timing stamp data.

17. A non-transitory machine readable medium having embodied thereon a program, the program providing instructions for a method for transmitting multiple video streams over a high speed link, comprising:
   detecting a connection with a receiver by a transmitter;
   establishing a link comprising a plurality of lanes with the receiver by the transmitter;
   framing data into multiple streams of video data;
   packing the multiple streams of video data into a transfer unit; and
   transmitting by the transmitter the transfer unit having the multiple stream video data over one or more lanes of the link to the receiver, at least one of the one or more lanes of the link having the multiple streams of video data transmitted thereon.

18. The non-transitory machine readable medium of claim 17, wherein packing includes packing framed information about the video data into one or more lanes of the link.

19. The non-transitory machine readable medium of claim 18, wherein framed information is packed into up to four lanes of the link.

20. The non-transitory machine readable medium of claim 17, wherein packing includes identifying video streams within the transfer unit using a stream delimiter.

21. The non-transitory machine readable medium of claim 20, wherein separate streams are identified by two consecutive stream delimiters.

22. The non-transitory machine readable medium of claim 20, wherein a stream delimiter appears on an even line within the transfer unit.

23. A transmitter unit for transmitting high speed video data, comprising:

a framing module configured to frame data into streams of video data;

a packing module configured to pack framed video stream data for multiple video streams into at least one lane;

an encoder configured to encode one or more transfer units having video data for the video streams; and a transmitter interface configured to transmit the encoded transfer units over a link to a receiver, the link comprising a plurality of lanes, the at least one lane having the multiple streams of video data transmitted thereon.

24. The method of claim 23, the packing module configured to identifying a stream delimiter in the transfer unit.

* * * * *